Nov. 13, 1945.    H. J. DANA    2,389,030
POLE SOUNDNESS TESTER
Filed Jan. 21, 1944    2 Sheets-Sheet 1
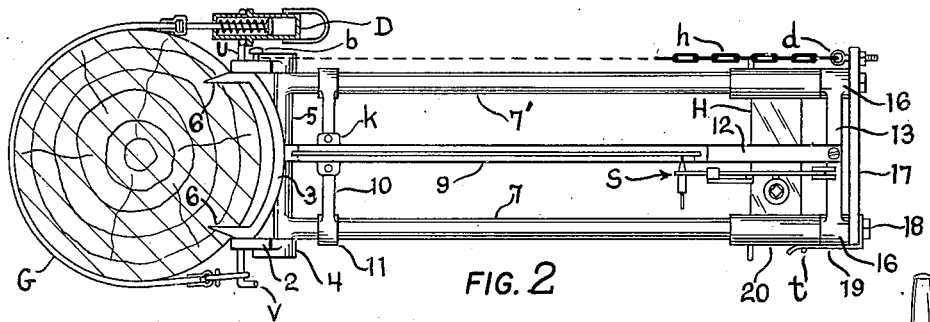

Nov. 13, 1945. H. J. DANA 2,389,030
POLE SOUNDNESS TESTER
Filed Jan. 21, 1944 2 Sheets-Sheet 2
FIG. 5
POLE NO. H5439   SIZE 12   DATE 8/5/43
FIG. 6
POLE NO. N4873   SIZE 14   DATE 8/5/43
FIG. 7
POLE NO. K3462   SIZE 14   DATE 8/5/43
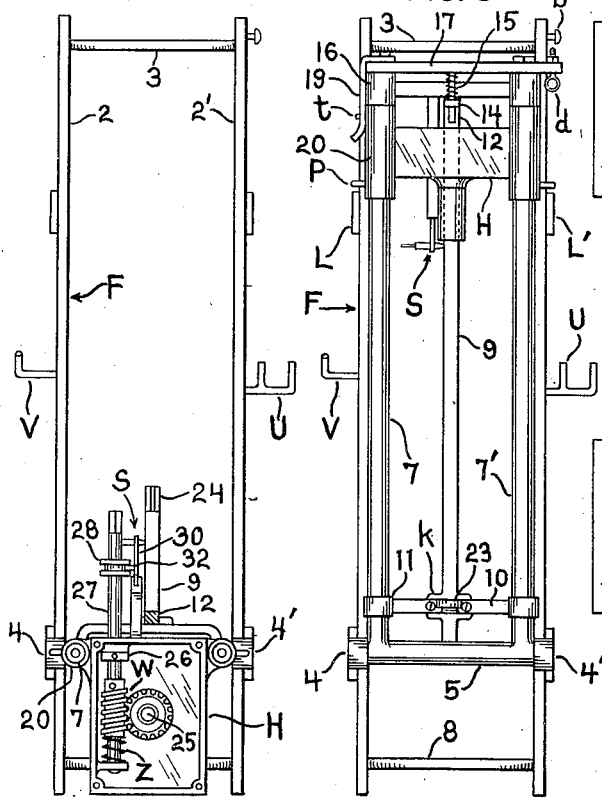
FIG. 8  FIG. 9
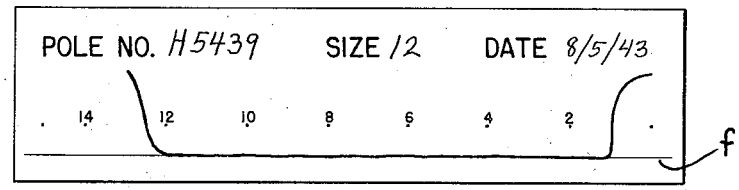
FIG. 10
POLE NO. R7856   SIZE 14   DATE 8/5/43
FIG. 11
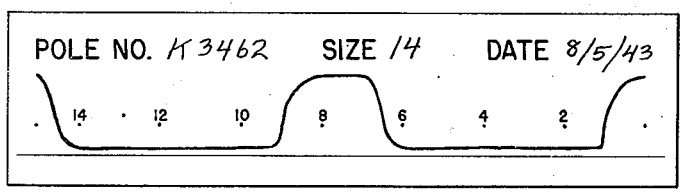
POLE NO. K3463   SIZE 14   DATE 8/5/43
INVENTOR
HOMER J. DANA
BY O. W. Lee
ATTORNEY Patented Nov. 13, 1945

2,389,030

UNITED STATES PATENT OFFICE 2,389,030

POLE SOUNDNESS TESTER

Homer J. Dana, Pullman, Wash.

Application January 21, 1944, Serial No. 519,137

10 Claims. (Cl. 73—81)

The present invention relates to certain new and useful improvements in a pole soundness tester for the purpose of determining and recording the internal and external deterioration of standing poles in electrical lines, such as power transmission lines, telephone and telegraph lines.

In a single operation, the invention will determine the hardness of the wood through the diameter of the standing pole, locate and measure any heart rot and surface rot, and graphically record the existing conditions, so as to provide a census of the condition of the poles in a transmission line, or any part thereof, as circumstances may suggest or necessity require.

Engineers are well aware that the strength of a pole in a transmission line must afford a reasonable margin of safety to withstand storms. It is well known that the strength required will depend upon the number of lines carried by the pole and the extent of accumulation of frost, sleet, or snow, with relation to the velocity of the wind which may be exerted against the increased diameter of the wires occasioned by such accumulations brought about by weather conditions.

The maintenance of extensive transmission lines presents a complex problem of pole conditions and weather conditions. The weather conditions for any particular locality are readily available, and the ordinary linemen can readily measure the accumulation upon the wires in each locality where they work, so that proper records thereof can be preserved by the engineering department. Reasonable judgement of linemen as to the conditions of poles, is subject to considerable variation in opinion; and furthermore, it is difficult to systematically record such opinions and reports. Without tangible evidence of the actual condition of the poles, there is no certainty of the existing conditions. The present invention provides tangible evidence in the form of a graph which constitutes a permanent record to which the engineer can repeatedly refer, and contrast with the graphs of other poles in the same locality, or in different localities, so as to gain complete information of the extent to which the weather, soil conditions, etc., affect the poles relative to their age, locality, and different preservatives used, all of which are vital factors in the maintenance of extensive transmission lines.

Most poles break below the ground line, for which reason the present invention is made so as to determine the condition of the pole below the ground line where the break usually occurs, and also where deterioration is most likely to occur, because of moisture, soil chemistry, bacteriology of the soil, etc.

The invention can be operated by the ordinary workman, and the resulting graph identified by a pole number, so that the records can be systematically filed, for consideration by the engineering department and analysis of the evidence obtained, so as to appraise the value of the standing poles for service, or else for inventory, depreciation, etc.

The invention utilizes a screw prod which is mechanically driven through the diameter of the pole by a floating drive which actuates a scriber to graphically record the variations in torque caused by the resistance of the wood to the penetration of the screw prod.

The accompanying drawings show a practical embodiment of the invention and illustrate the nature and principle of its operation.

Fig. 1 shows a side elevation of the invention in operative position upon a pole.

Fig. 2 is a plan view of Fig. 1.

Fig. 3 shows a detailed sectional view of the spring urged scriber point.

Fig. 4 shows a drive cable optionally used with Fig. 1.

Figs. 5, 6 and 7 illustrate graphs produced by the invention.

Fig. 8 shows an end elevation of the invention with the gear housing opened to disclose the drive mechanism, the nearer parts being removed for convenience of illustration.

Fig. 9 shows the invention in folded position, ready to latch; parts being omitted for convenience of illustration.

Figs. 10 and 11 illustrate half diameter graphs produced by the invention when made in shortened form.

The device of my invention is preferably made so as to be readily folded up for convenience of carrying it from one pole to another. As shown in the drawings, the device is hinged to a frame F comprising a pair of upright bars 2—2' connected together at the bottom by a curved bar 8 and also connected together at the top by a curved bar 3 which terminates in a pair of spikes 6 for anchoring to the pole. Any suitable means may be employed for holding this frame in position upon the pole. In the present instance there is shown a strap G having a number of drop links of chain C selectively cooperating with a hook V, and the opposite end of this strap is provided with a spring urged clamp D which engages a hook U on the opposite side of the frame. It will be seen that this disclosure will suffice for various sizes of poles by merely selecting the appropriate link of chain required to keep the spring clamp D under suitable tension.

A pair of parallel shafts 7—7' are connected together as indicated at 5 and hinged to brackets 4—4' carried by the bars 2—2'. The housing H is provided with a pair of guide bearings 20 which are slidably mounted on these parallel shafts. Journaled in this housing is a worm and gear, collectively indicated at W; the worm being mounted on a vertical shaft 27 which is slidably mounted in the housing, and a spring Z is compressed by the downward end thrust of the worm, the collar 26 being employed to tension the initial compression of this spring. The shaft 25 is fixed to the worm gear and extends forwardly through the housing, where it is held in place by a sleeve 29 pinned thereto. This sleeve 29 is also pinned to the butt end of the shank 21 of the screw prod 22. Thus the screw prod can be turned by the worm and gear, and the torque of the drive force will compress the spring Z according to the resistance encountered in boring into a pole.

In order that this resistance may be measured and recorded upon a graph, the worm shaft 27 is provided with a flanged collar 28 which operates a scriber mechanism collectively indicated at S. As best seen in Fig. 1 this scriber mechanism comprises a lever arm 30 having a movable fulcrum 33 mounted in the leg 34 of a U-support which is secured to the top of the housing H. The upper end of the opposite leg 36 is saddled over this lever arm 30 and serves as a guide therefor. The link 35 connects the lever arm 30 to the leg 36 so as to move the fulcrum 33 in accordance with the movement of the lever arm 30. The length of the link 35 and the location of its pivots being such that the arc of the lever arm 30 will be converted into a vertical line and thereby enable the scriber to make true curves directly indicating the compression of the spring Z. As best seen in Fig. 8 this lever arm is provided with a pin or roller 32 which engages between the flanges of the collar 28 whereby the downward thrust of the worm against the spring Z will be imparted to the lever arm 30 and the scriber point carried thereby.

Any suitable scriber point may be employed; as for instance, in Fig. 3 the lever arm 30 is shown with a bushing B which preferably has a driven fit in this lever arm and extends a short distance therethrough, as illustrated. The sleeve Y is slidably mounted in this bushing B and the spring R seats against a flange Q on this sleeve. The cylinder M has a driven fit upon the bushing B or may be threaded thereto if desired. The lead X fits snugly in the sleeve Y, and the pin E is employed to feed out the lead as required. This pin may have a threaded engagement within the sleeve in the well known manner of automatic pencils; or as here shown, the sleeve may be split and provided with a collar N to provide a gripping action, either by threaded engagement with the sleeve, or else by a set screw such as shown at T. It will be seen that this construction will compensate for wear upon the lead and assure constant contact with the graph.

The graphs are preferably made upon cards inserted into a holder 9, which should have a solid back wall with suitable grooves at the ends and bottom for retaining the graph card in position. As shown in Fig. 1 and Fig. 2 this graph holder 9 is slidably mounted upon the previously described shafts 7—7'. This is accomplished by providing a pair of bearings such as 11 connected together by a web 10 to which the graph holder 9 is bolted through the lips K which are provided for that purpose. The outer end of this graph holder is similarly supported upon bearings 16—16 which are connected together by a web 13 to which there is bolted a reach bar 12 which extends from the end of the graph holder so that the bearings 16—16 can be positioned behind the previously described bearings 20 of the housing H. Thus it will be seen that the graph holder 9 is supported upon a carriage unit which has a limited movement upon the shafts 7—7' and that the bearings 20 of the housing H are freely slidable upon these same shafts. The crossbar 17 is bolted to the ends of these shafts as indicated at 18 so as to limit the outward movement of these bearings and also to provide a brace between the two shafts.

To latch these bearings in their outermost position, there is provided a spring latch 19 which engages a pin t on the bearing 20 so as to hold all of these bearings against sliding movement during inoperative periods. As shown in Fig. 9 the underside of the reach bar 12 is provided with a depending bracket 14, and the crossbar 17 is provided with a compression spring 15 retained by a guide pin which slides through this bracket. Thus it will be seen that when the spring latch 19 is disengaged, the spring 15 will move the graph carriage forward and carry the bearings 20 with it a corresponding amount. As shown in Fig. 1 the graph holder 9 is provided with a stop member 24 which contacts the pole to thereby limit the movement effected by the spring 15.

It will be noted that the end of the screw prod 22 is even with the stop member 24, and therefore both of them will contact the pole at the same time and thus provide the same zero point for the graph scriber, when the device is used upon various poles of different diameters. In any instance where surface rot has decreased the underground diameter of the pole, the housing H is then pushed forward until the screw prod 22 contacts the pole, in which case the graph scriber will make a horizontal straight line indicating the extent of surface rot.

As shown in Fig. 1 and Fig. 9 the underside of the crossbar 10 is provided with a depending bracket 23 which serves as a guide support for the shank 21 of the screw prod 22, an open stirrup or a hook being sufficient for this purpose. In Fig. 9 the screw prod is removed for convenience of illustration, and the guide bracket 23 is shown unoccupied.

The screw prod 22 is similar to an increment borer, except that it does not cut a core. It should be either a double or else a triple screw bit so as to penetrate rapidly, and it should be as small as practical for the required purpose.

For driving the screw prod 22 into the pole, the worm shaft 27 may be turned in any suitable manner; as for instance in Fig. 1 there is shown a drive shaft 38 having a universal joint J and including a socket cap 37 for detachably engaging the illustrated squared end of the shaft 27. This drive shaft 38 may be bent to form a crank in the well known manner, but it is here shown with a squared upper end for engagement with the socket cap 39 of the crank handle which may be secured thereto by a set screw. A swiveled grip 40 is provided above the socket cap 39 so as to hold the shaft 38 at a suitable inclination while turning it by the crank 41.

Fig. 4 shows a drive cable 48 with a socket cap 47 for engaging the squared end of the worm shaft 27, and it will be seen that this drive cable may be used instead of the drive shaft 38 of Fig. 1 so as to thereby eliminate the need of the universal joint J. The socket cap 39 of Fig. 1 may be engaged with the squared head of the drive cable 48 so as to employ the crank handle of Fig. 1.

For convenience in holding the device in folded position when in disuse, the pole frame F is provided with a pair of slotted brackets such as illustrated at L in Fig. 1 and a post such as P is provided on each of the paired bearings 20 for engagement in these slotted brackets L. As shown in Fig. 9 the device is raised to the folded position while the spring latch 19 holds these bearings at their outermost position, whereupon this spring latch is then manually disengaged from its pin $t$ so that the posts P can descend into the slotted brackets L and hold the device in its folded position upon the frame F, whereupon it can be carried by using the bar 3 as a handle, suitable clearance being left between it and the crossbar 17 to afford a convenient grasp, or else they may be close enough together to afford a single grasp around both of them.

The posts P remain seated in the slotted brackets L—L' by gravity, and are disengaged by lifting the housing H upwardly as shown in Fig. 9, whereupon the spring latch 19 will engage the pin $t$ to hold the bearings against inadvertent movement while the device is being unfolded to the operative position shown in Fig. 1 where a stay chain $h$ is employed to support the device in its operative position relative to the pole frame F. This chain $h$ may be attached in any suitable manner; as for instance, Fig. 2 shows a screw eye $d$ bolted to the crossbar 17, and a post $b$ is provided at the upper end of the pole frame F, the chain $h$ is linked into this screw eye $d$ and extends to the post $b$ as indicated by the dotted line for convenience of illustration, the direction of the chain $h$ being shown in Fig. 1 where the lower end is indicated by a dotted line for convenience of illustration, and in Figs. 8–9 the chain is omitted for like reason.

In the preferred operation of the device, the earth is scooped out at one side of the pole and the device mounted below the ground level as shown in Fig. 1. The spring latch 19 is then lifted so that the spring 15 (Fig. 9) can move the graph frame 9 forward until the stop member 24 contacts the pole, which also moves the screw prod forward to contact the pole, it being noted that these movements do not produce any mark upon the graph card. If the below ground diameter of the pole is lessened by surface rot, the housing H is manually pushed forward until the screw prod 22 contacts solid wood, which will cause the graph point to make a horizontal straight line equal to this movement. The screw prod 22 is then driven into the pole by turning the worm gear W in the manner previously described. The progress of the screw prod into the pole will cause a forward movement of the housing H and the scriber mechanism S carried thereby; and the resistance of the wood will retard the rotation of the screw prod so as to compress the spring Z (Fig. 8) in accordance with the driving torque required for penetration of the pole. The scriber S traveling across the graph card will record a graph showing the relative soundness of the wood along the path followed by the screw prod in its progress through the pole.

A plain card will suffice for a graph, but for convenience of illustration, the graph cards shown in Figs. 5, 6 and 7 are each provided with a row of horizontally spaced dots indicating an acceptable standard of safety for the hardness of a pole, as determined by known facts and experience. The small numerals indicate inches of travel through the pole. The fine ruled line $f$ indicates a margin of safety 60% more than the acceptable standard designated by the aforesaid row of dots. Suitable identifying data is provided at the top of the graph card.

As shown in Fig. 5, the graph curve at the right indicates the normal entrance of the screw prod into sound wood at the surface of the pole, the effective bite of the screw prod being considered as one inch. Then the graph line continues along the 60% margin of safety until the screw prod emerged at 12 inches as indicated by the graph curve at the left, this pole being 12 inches in diameter as indicated. Thus the engineer would know that this pole has considerable useful life before it would become a hazard.

In Fig. 6 the right end of the graph shows a horizontal line at zero which continues for one inch before the screw prod encountered sound wood and produced the characteristic entrance curve, then the graph line continues along a 30% margin of safety until the screw prod emerged at 13 inches, thus indicating one inch of surface rot on this 14 inch pole, because otherwise the graph would show that the screw prod emerged at 14 inches instead of at 13 as here indicated. Thus the engineer would know that this 14 inch pole has one inch of surface rot all the way around it, which of course reduces its diameter to only 12 inches, and furthermore the hardness of the wood is only 30% more than the acceptable margin of safety, and therefore this pole has only a limited useful life before it would become a hazard. The engineer well knows that surface rot decreases the strength of a pole far more than heart rot, and he can readily calculate the breaking force of this pole and compare it with the existing requirements and possible severity of storms in that locality. Thus he will know how soon that pole must be replaced, taking into consideration the length of time in which the existing deterioration occurred and its probable future progress.

In Fig. 7 the right end of the graph curve shows the normal entrance of the screw prod into sound wood, and then the graph line continues along at a 45% margin of safety until at 6 inches the screw prod emerged into heart rot and the graph rises to the zero line where it continues until the screw prod again entered sound wood at 8 inches whereupon the graph curve then returns to the same 45% margin of safety until the screw prod emerged at 14 inches, that being the indicated size of this pole.

From the description of these graphs, it will be seen that the invention provides tangible evidence of the condition of standing poles and affords permanent records which can be conveniently filed for future reference readily accessible to members of the engineering department and possible changes of personnel therein, so that emergencies in one locality can be carefully compared with the condition of the poles in the same and other localities and thereby determine the maintenance requirements necessary to prevent pole breakage during storms.

The illustrated graphs are intended only as an example, and various other modes of standardization may be employed. As for instance the compression of the spring Z may be such as to record the hardness of a new pole of known standard, so that the graph will be in percentages of new pole hardness, or the graph may indicate pounds of pressure upon a standardized spring, these matters being subject to the choice of engineers as to the convenience of interpretation and ease of expression orally and written.

The disclosure shows an embodiment adapted to bore all the way through a 14 inch pole; however, it is equally feasible to shorten the device and bore only 8 inches deep, as that will produce a graph providing substantially the same information, and also make the device more compact as well as require less time for operation. Figs. 10 and 11 show graphs of this nature.

The graph of Fig. 10 shows the normal entrance of the screw prod into sound wood and the graph line continues at the 60% margin of safety until the bore is 7 inches deep, whereupon the boring was discontinued at the center of the 14 inch pole which is free from surface rot and heart rot.

The graph of Fig. 11 shows the normal entrance of the screw prod into sound wood and the graph line continues at the 60% margin of safety until 6 inches is reached, whereupon the graph curve rises as the screw prod emerged into heart rot which extended to 8 inches, indicating a heart rot of two inches on this 14 inch pole which is otherwise in sound condition.

It will be seen that these shorter graphs adequately serve the required purpose, and that the device can readily be shortened a corresponding amount, preserving all of the structural relationships the same as hereinbefore described. The resulting compactness is desirable for convenience in handling.

Referring again to Figs. 1 and 2 it will be seen that when the frame F is clamped to the pole, it will suffice to merely provide a series of notches on the edges of the frame which contact the pole and that such will adequately prevent slipping, even though the illustrated spikes 6 are omitted. It will also be seen that the chain C may be made long enough to surround the pole and connect direct to the spring urged clamp D, so as to eliminate the need of the illustrated strap G. Furthermore, the spikes 6—6 may be of sufficient length and suitably inclined downward towards their points so as to hold the device in position upon the pole by means of these two spikes and gravity, as the boring operation does not transmit any force to dislodge the device from the pole, and therefore, clamping is not essentially necessary when downwardly inclined spikes are employed.

I claim as my invention:

1. A pole soundness tester comprising a frame for attachment to a standing pole, parallel shafts extending outwardly from said frame, a housing having bearings slidably mounted on said shafts, a worm slidably journaled in said housing, a gear meshing with said worm, a forwardly extending screw prod turned by said gear, a spring compressed by the end thrust of said worm, a scriber mechanism mounted on said housing and operated by the end thrust of said worm, a slidably mounted graph holder having a stop member indexing with the forward end of said screw prod when said scriber is at the initial zero position upon said graph holder, said graph holder being mounted so that its forward movement is imparted to said housing and the screw prod and scriber carried thereby so that said initial zero position will be the same for poles of different diameters, means to turn said worm to drive said screw prod into a pole, whereby said scriber will record a graph of the force required to drive said screw prod into a pole.

2. A device as defined in claim 1 wherein said parallel shafts are hinged to said frame so as to be folded thereupon, slotted brackets upon said frame, said bearings being provided with posts for engaging in the slots of said brackets to hold said housing against downward movement when in the folded position, a spring latch holding said bearings when said posts are lifted clear of said brackets, and means to support said parallel shafts in the unfolded position.

3. A pole soundness tester comprising a frame for attachment to a standing pole, parallel shafts extending outwardly from said frame, a housing slidably mounted on said shafts, a graph holder slidably mounted on said shafts and imparting its forward movement to said housing, a worm slidably journaled within said housing, a gear meshing with said worm, a forwardly extending screw prod turned by said gear, a spring compressed by the end thrust of said worm, a scriber mechanism mounted on said housing and operated by the end thrust of said worm, a stop member on the forward end of said graph holder and indexing with the forward end of said screw prod when said scriber is in the initial zero position upon said graph holder, means to turn said worm to drive said screw prod into a pole, whereby said scriber will be actuated in accordance with the soundness of the pole penetrated by said screw prod.

4. A pole soundness tester comprising a frame for attachment to a standing pole, parallel shafts extending outwardly from said frame, a housing slidably mounted on said shafts, a worm slidably journaled within said housing, a gear meshing with said worm, a forwardly extending screw prod turned by said gear, a spring compressed by the end thrust of said worm, a scriber mechanism mounted on said housing and operated by the end thrust of said worm, a graph holder mounted in operative position relative to said scriber, means to turn said worm to drive said screw prod into a pole, whereby said scriber will be actuated in accordance with the soundness of the pole penetrated by said screw prod.

5. A pole soundness tester comprising a screw prod driven by a gear, a slidably mounted worm meshing with said gear, a spring urged by the end thrust of said worm, a scriber mechanism actuated by the end thrust of said worm, a graph holder mounted in operative position relative to said scriber, means to index said graph holder with said screw prod so that said scriber will register the same initial zero locating the normal surface on poles of different diameters, means to mount said device upon a standing pole, and means to turn said worm, whereby said scriber will record the soundness of the pole penetrated by said screw prod.

6. A pole soundness tester comprising a screw prod driven by a gear, a slidably mounted worm meshing with said gear, a spring urged by the end thrust of said worm, a scriber mechanism actuated by the end thrust of said worm, a graph holder mounted in operative position relative to said scriber, means to mount said device upon a standing pole, and means to turn said worm, whereby said scriber will record the soundness of the pole penetrated by said screw prod.

7. A device as defined in claim 3 wherein said graph holder is spring urged forwardly and imparts its forward movement to said housing and the parts carried thereby.

8. A device as defined in claim 3 wherein said graph holder is spring urged forwardly and imparts its forward movement to said housing and the parts carried thereby, and a latch to hold said graph holder and housing against forward movement.

9. A device as defined in claim 3 wherein said frame is attached to a standing pole by means including drop links of chain selectively engageable with a hook upon one side of said frame, and the opposite end of said attaching means being provided with a spring urged clamp engageable with the opposite side of said frame.

10. A device as defined in claim 3 wherein said frame is provided with a pair of pointed spikes for anchoring the same upon a standing pole.

HOMER J. DANA.